United States Patent
Miller, Jr.

(10) Patent No.: US 11,067,222 B1
(45) Date of Patent: Jul. 20, 2021

(54) CAMERA MOUNT SYSTEM AND METHOD OF USE

(71) Applicant: Lawrence F. Miller, Jr., Shepherd, TX (US)

(72) Inventor: Lawrence F. Miller, Jr., Shepherd, TX (US)

(*) Notice: Subject to any disclaimer, the term of this patent is extended or adjusted under 35 U.S.C. 154(b) by 76 days.

(21) Appl. No.: 16/549,249

(22) Filed: Aug. 23, 2019

(51) Int. Cl.
*G03B 17/56* (2021.01)
*F16M 13/02* (2006.01)
*F16M 11/10* (2006.01)

(52) U.S. Cl.
CPC .......... *F16M 13/022* (2013.01); *F16M 11/10* (2013.01); *G03B 17/561* (2013.01); *F16M 2200/022* (2013.01)

(58) Field of Classification Search
CPC .. G03B 17/561; F16M 13/022; A01M 31/002
See application file for complete search history.

(56) References Cited

U.S. PATENT DOCUMENTS

| | | | | |
|---|---|---|---|---|
| 7,926,774 | B1* | 4/2011 | Wilson | F16M 13/022 248/229.14 |
| 8,016,134 | B1* | 9/2011 | Templin | F16M 13/022 211/85.7 |
| 8,480,316 | B2* | 7/2013 | Smith | F16M 13/022 396/427 |
| 9,188,280 | B2* | 11/2015 | Congdon | F16M 11/14 |
| 10,191,357 | B2* | 1/2019 | DeMers | G03B 17/561 |
| 10,474,013 | B2* | 11/2019 | Wynalda, Jr. | G03B 17/561 |
| 10,495,953 | B2* | 12/2019 | Calhoun | G03B 17/561 |
| 10,698,299 | B2* | 6/2020 | DeMers | F16M 11/2078 |
| 10,834,916 | B2* | 11/2020 | D'Acquisto | A01K 29/005 |
| 10,866,493 | B2* | 12/2020 | DeMers | F16M 11/14 |
| 2010/0208068 | A1* | 8/2010 | Elsemore | A01M 31/002 348/143 |
| 2019/0227414 | A1* | 7/2019 | Umphries | F16M 13/00 |
| 2020/0041066 | A1* | 2/2020 | Burdick | G03B 17/00 |

* cited by examiner

*Primary Examiner* — Bradley Duckworth
(74) *Attorney, Agent, or Firm* — Leavitt Eldredge Law Firm

(57) ABSTRACT

A camera mount system includes a clamp having a first side and a second side, the first and second side forming an opening therebetween; a tension device extending between the first side and the second side, the tension device to apply pressure to pull the first side and the second side together; and a camera housing secured to the clamp, the camera housing configured to hold a camera therein; the clamp is to secure to a tree or post.

5 Claims, 4 Drawing Sheets

CAMERA MOUNT SYSTEM AND METHOD OF USE

BACKGROUND

1. Field of the Invention

The present invention relates generally to camera mounting systems, and more specifically, to a mounting system for mounting to a tree, post, or similar structure, wherein the mounting system is easy to install and remove as desired by the user.

2. Description of Related Art

Camera mounting systems are well known in the art and are effective means to place cameras on structures. For example, FIG. 1 depicts a conventional camera mount system 101 for trail cameras, having a housing 103 with a door 105 pivotally secured thereto, and having an opening 107 for a camera to capture photos. During use, the system 101 is secured to a structure, such as a tree, by a strap (not shown).

One of the problems commonly associated with system 101 is limited use. For example, it may be difficult for the user to easily install the camera at a desired location. Further, the system 101 may not always secure strongly to the structure, thereby resulting in the system becoming loose. Lastly, the housing 103 does not allow for pivoting of the camera, thereby only allowing for the camera to point at a fixed angle, which can limit the range of use of the system.

Accordingly, although great strides have been made in the area of camera mounting systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
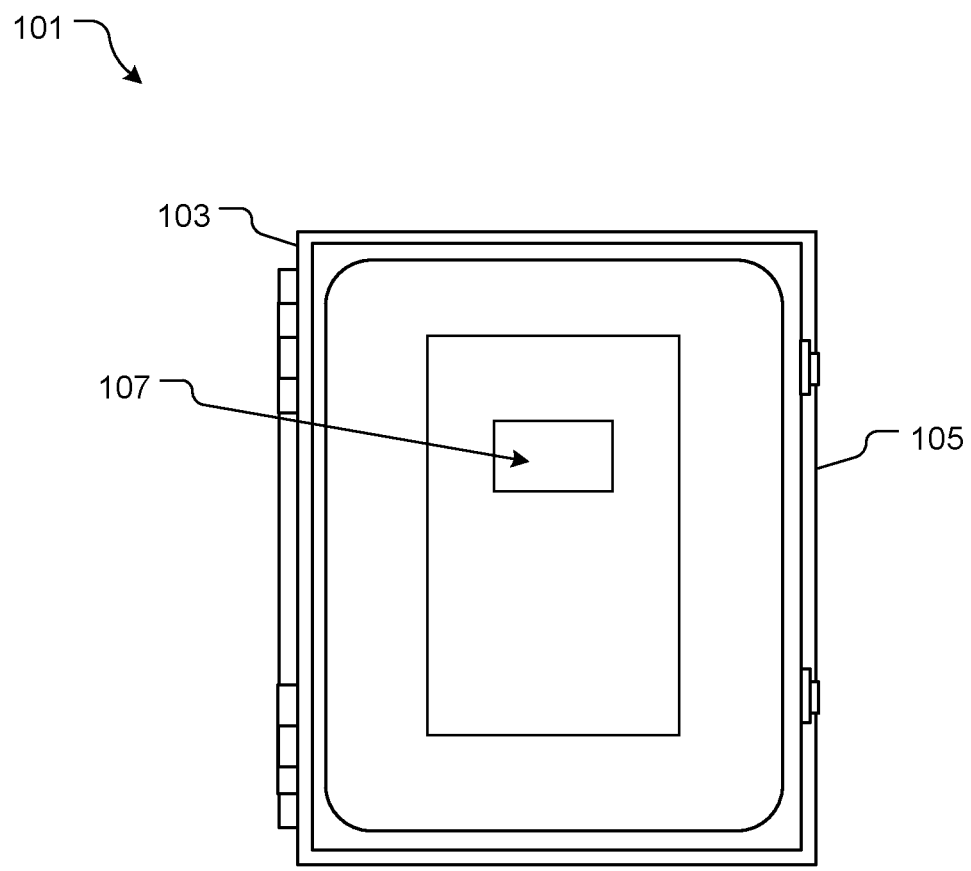
FIG. 1 is a front view of a common camera mounting system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional camera mounting systems. Specifically, the present invention provides for an easy mounting system that also includes an adjustable housing for a camera to provide the user with flexibility. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
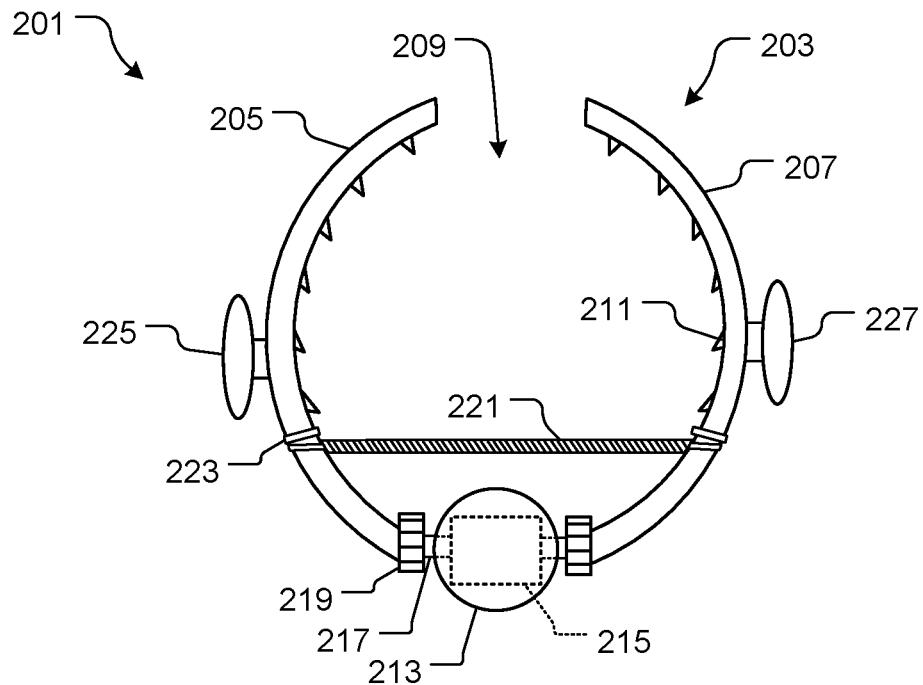
FIG. 2 is a top view of a camera mounting system in accordance with a preferred embodiment of the present application.
Figure 3:
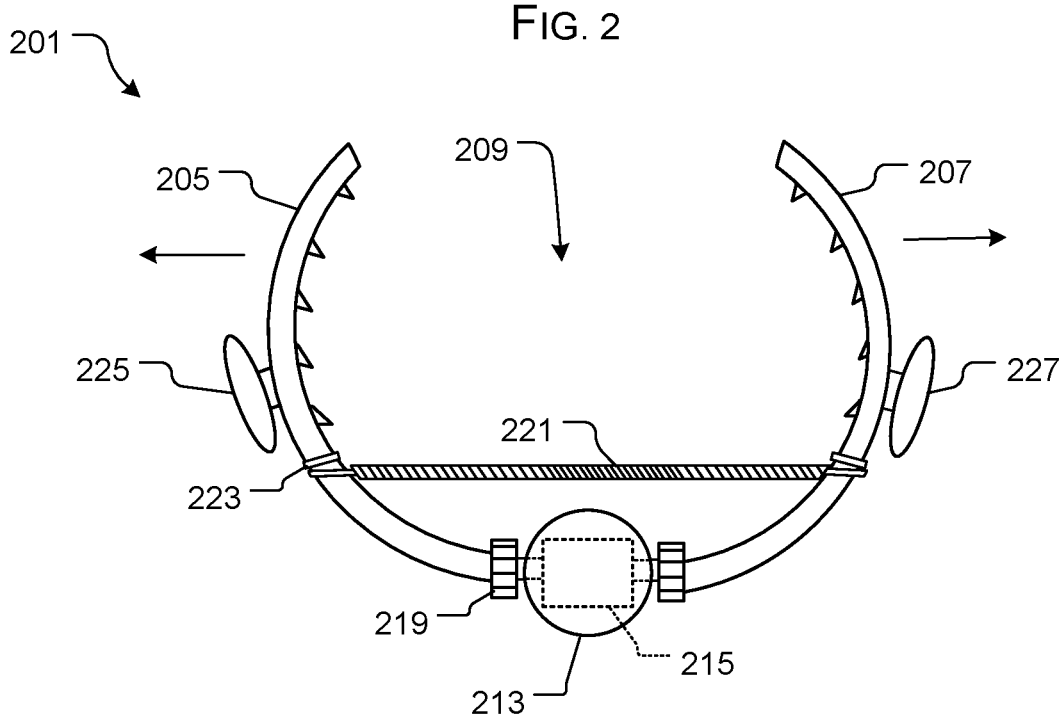
FIG. 3 is a top view of the system of FIG. 2.

Referring now to the drawings wherein like reference characters identify corresponding or similar elements throughout the several views, FIGS. 2 and 3 depict top views of camera mounting system 201 in accordance with a preferred embodiment of the present application. It will be appreciated that system 201 overcomes one or more of the above-listed problems commonly associated with conventional camera mounting systems.

In the contemplated embodiment, system 201 includes a clamp 203 with a first side 205 and a second side 207 forming an opening 209 therethrough. The clamp 203 is configured to extend around a structure 401, such as a tree, post, or the like. In the preferred embodiment, the first and second sides also include teeth 211 that extend from an interior surface and are configured to provide for additional gripping on the structure. It should be appreciated that the materials of the clamp can vary, and can be aluminum, metals, or the like, as aesthetical, functional, or manufacturing considerations require.

System 201 further includes a camera housing 213 which can vary in materials, size, and shape, the housing 213 housing a camera 215 and connected to the clamp 203 via one or more swivel connections 217 and adjustable knobs 219, wherein the housing is thereby configured to pivot.

The system 201 further includes a tension apparatus 221, the tension apparatus configured to apply force to close the opening, thereby providing for securing of the mounting system to the structure. The tension apparatus 221 can be one or more springs, one or more rubber bands, or any other similar apparatus. The system can further include one or more stop bars 223 positioned on the first side and the second side.

As shown, in some embodiments, the system can include handles 225, 227 that provide for gripping the apparatus to pull the sides open, as shown in FIG. 3. Upon releasing the handles, the two sides are pulled together via the tension apparatus 221 to secure the mounting system in place.

Figure 4:
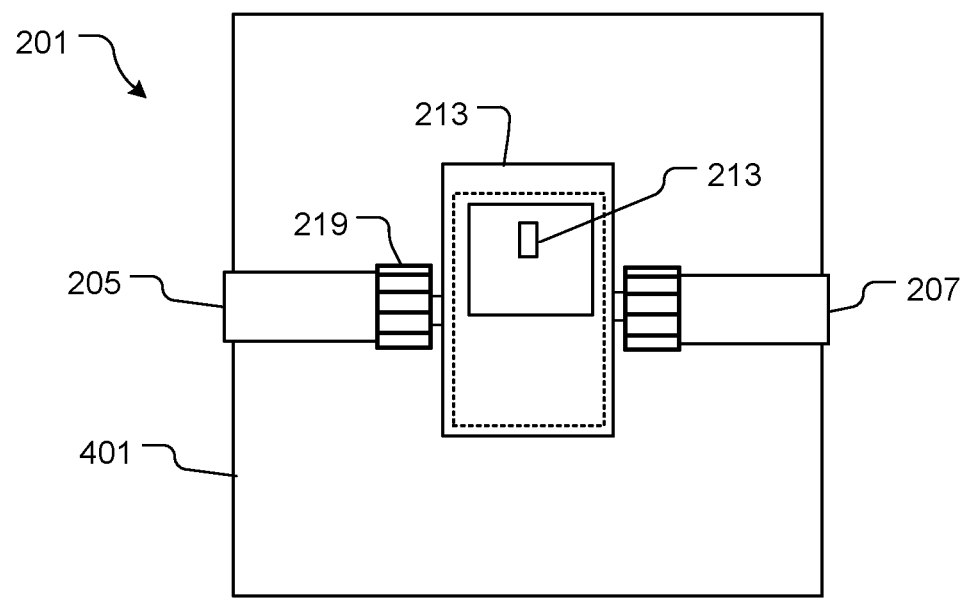
FIG. 4 is a front view of the system of FIG. 2 attached to a structure.
Figure 5:
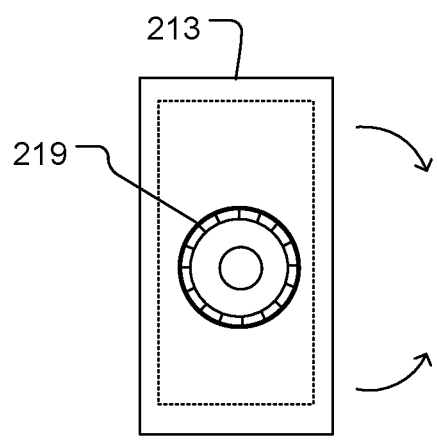
FIG. 5 is a side view of the camera housing pivoting relative to the swivel bracket.

In FIG. 4, a front view depicts the system 201 secured to a structure 401. As shown, the housing 213 positions a camera lens 403, such that the camera can be used to collect photos. As shown in FIG. 5, the adjustable knob 219 allows for the housing 213 to pivot, thereby allowing for adjustability of the angle of the capturing of photos.

Figure 6:
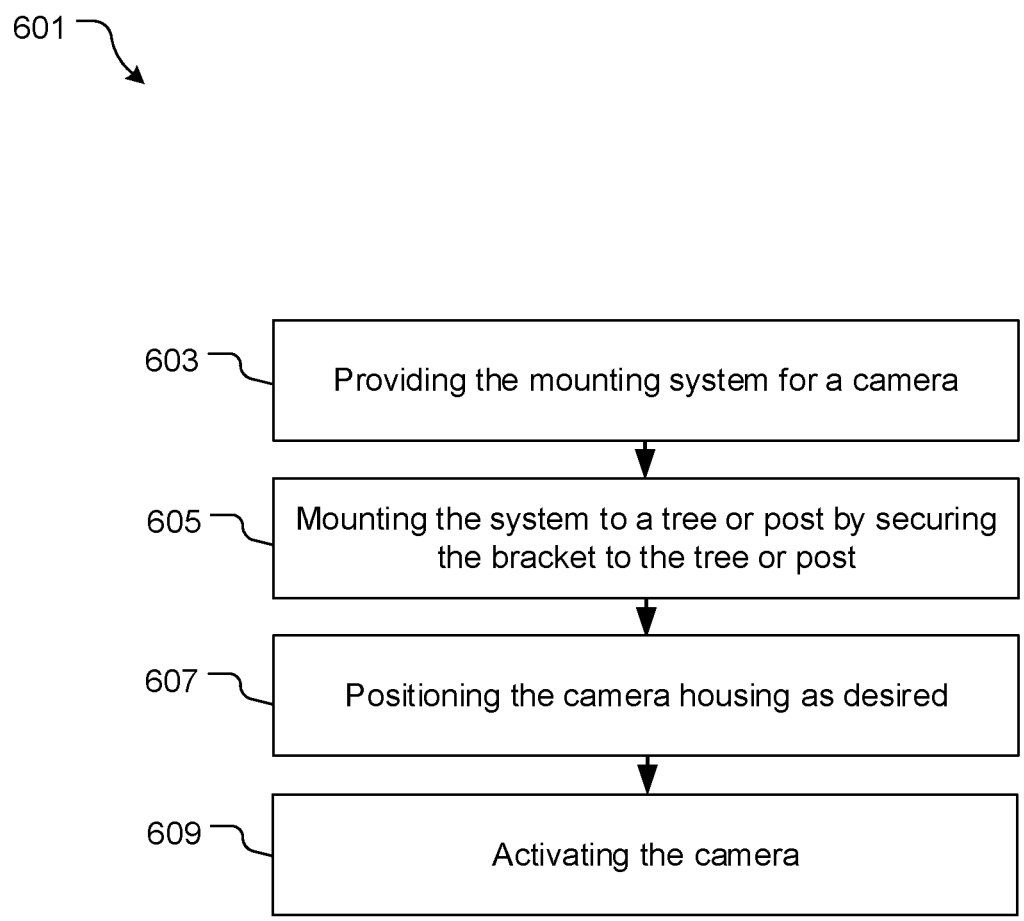
FIG. 6 is a flowchart of a method of use of the system of FIG. 2.

In FIG. 6, a flowchart 601 depicts a method of sue of the system 201. During use, the mounting system is secured to a structure, and the housing can be positioned to an angle as desired, as shown with boxes 603, 605, 607. The camera can then be activated for photos to be captured, as shown with box 609.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A camera mount system, comprising:
    a clamp having a first side and a second side, the first and second side forming an opening therebetween, the first side and the second side forming an inner area;
    a plurality of teeth extending from an inner surface of the first side;
    a tension device extending between the first side and the second side within the inner area, the tension device configured to apply pressure to pull the first side and the second side together;
    a stop bar secured to the first side, the stop bar is configured to prevent sliding movement of the tension device; and
    a camera housing secured to the clamp, the camera housing configured to hold a camera therein;
    wherein the clamp is configured to secure to a tree or post and grip to the tree or post via the plurality of teeth.

2. The system of claim 1, wherein the tension device is a spring.

3. The system of claim 1, wherein the tension device is a rubber band.

4. The system of claim 1, further comprising: one or more handles attached to the clamp.

5. The system of claim 1, wherein the camera housing further comprises:
    one or more swivel brackets attaching the camera housing to the clamp and configured to allow the camera housing to pivot.

\* \* \* \* \*